June 6, 1967 W. D. LUDWIG 3,323,548
BALANCED ROTARY SOLENOID VALVE
Filed Sept. 11, 1964 3 Sheets-Sheet 2
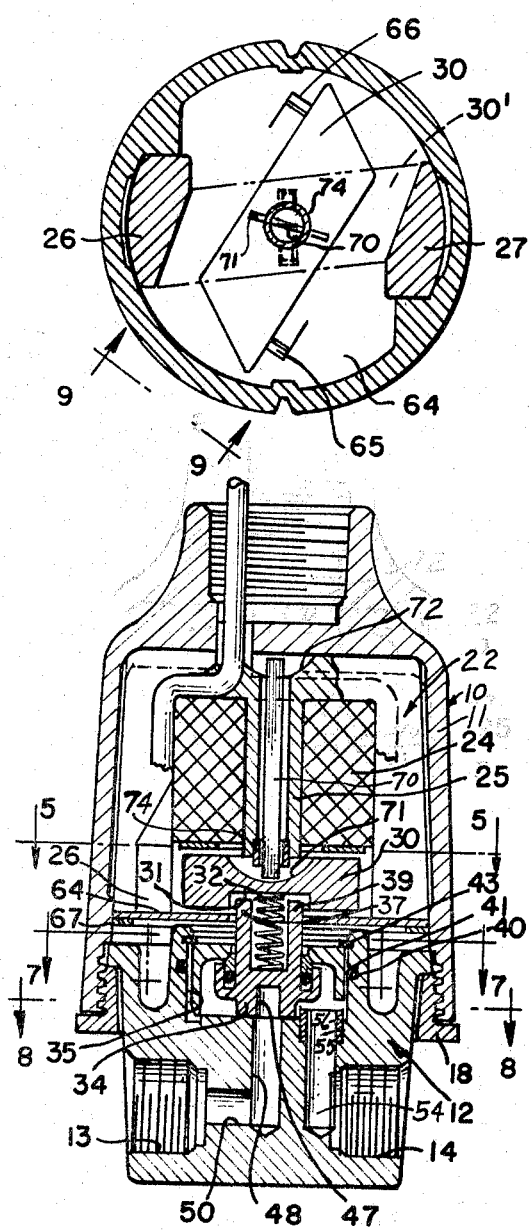
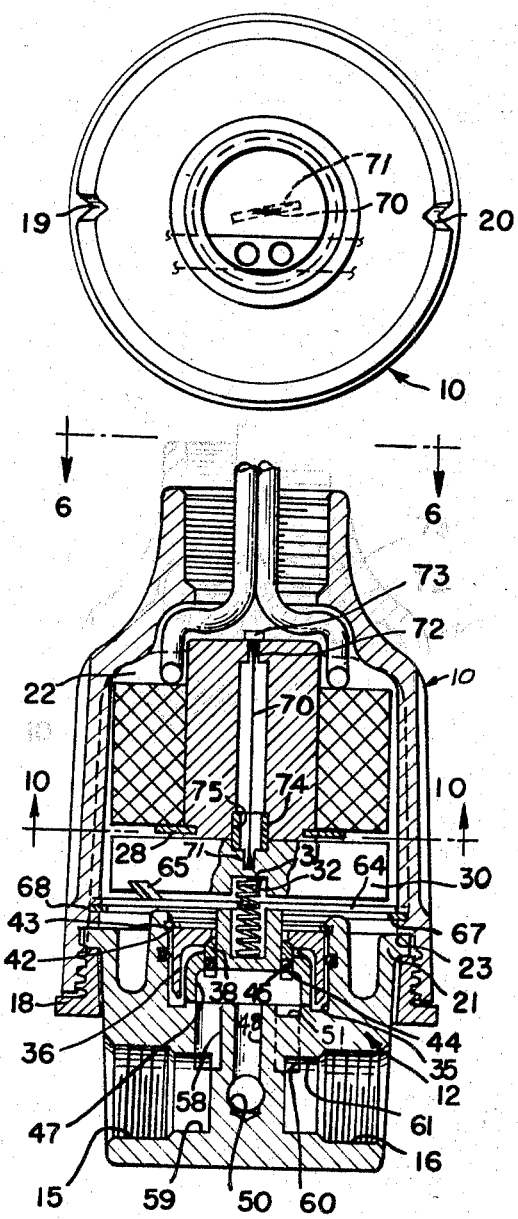
INVENTOR.
WALTER D. LUDWIG
BY
Donnelly, Mentag & Harrington
ATTORNEYS June 6, 1967 W. D. LUDWIG 3,323,548
BALANCED ROTARY SOLENOID VALVE
Filed Sept. 11, 1964 3 Sheets-Sheet 3
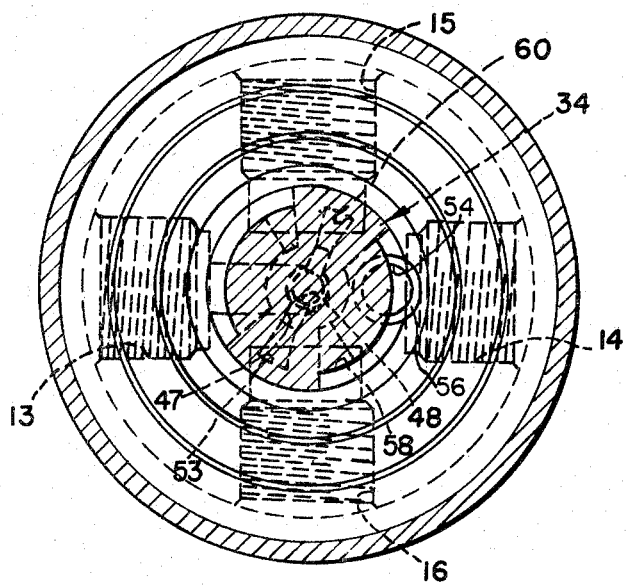
FIG. 7.
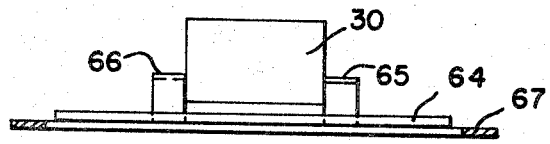
FIG. 9.
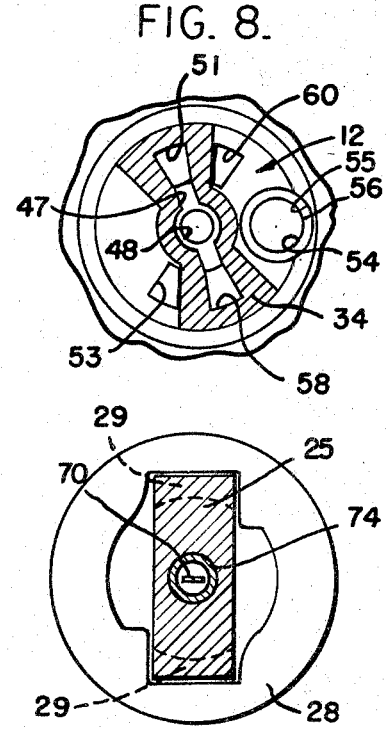
FIG. 8.
FIG. 10.
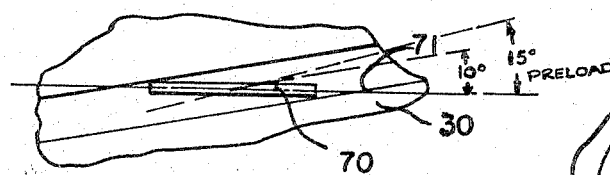
FIG. 11.
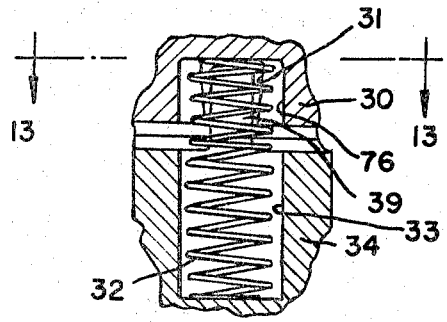
FIG. 12.
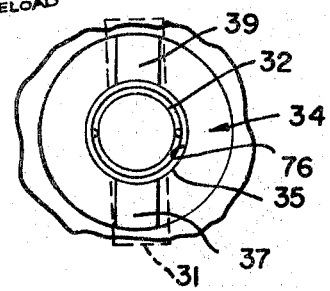
FIG. 13.
INVENTOR.
WALTER D. LUDWIG
Donnelly, Mentag & Harrington
ATTORNEYS United States Patent Office 3,323,548
Patented June 6, 1967

3,323,548
BALANCED ROTARY SOLENOID VALVE
Walter D. Ludwig, Bloomfield Township, Oakland County, Mich., assignor to Mac Valves, Inc., Oak Park, Mich., a corporation of Michigan
Filed Sept. 11, 1964, Ser. No. 399,959
19 Claims. (Cl. 137—625.65)

This invention relates generally to pressure fluid control valves and, more particularly, to a novel and improved rotary solenoid operated, pressure fluid control valve in which the valve is balanced.

Rotary solenoid operated, pressure fluid control valves are well known in the art. For example, Ludwig Patent No. 3,079,951 issued Mar. 5, 1963, discloses a rotary solenoid operated, pressure fluid control valve.

It is an object of this invention to provide an improved, rotary solenoid operated, pressure fluid control valve.

It is another object of this invention to provide a rotary solenoid operated, pressure fluid control valve which is ecomonical in construction and requires a minimum of parts.

It is a further object of this invention to provide in a rotary pressure fluid control valve, a valve element which requires only a single positioning bearing.

It is still another object of this invention to provide a pressure fluid controlling, rotary solenoid operated valve in which the pressures acting to separate the valve element from its seat are in balance about the center of rotation.

Still another object of this invention is to provide a rotary solenoid operated, pressurized fluid controlling valve with a rotary valve element with compensating fluid pressure means to maintain surface contact between the rotary valve element and its seat, and which is balanced relative to the pressurized fluid, and in which the same orifice size can be maintained over an entire operating range.

It is still a further object of this invention to provide a rotary solenoid actuated, pressurized fluid controlling valve which may be quickly and easily disassembled such that the rotary solenoid armature may be quickly and easily detached from the valve portion by means of a quickly releasable tongue and slot arrangement.

It is yet another object of this invention to provide a rotary solenoid operated, pressurized fluid control valve with a relatively simple explosion proof housing construction which can be quickly and easily disassembled to separate the valve structure from the rotary solenoid control structure.

It is still another object of this invention to provide a rotary solenoid actuated valve with a highly efficient magnetic frame on which the solenoid armature is rotatably mounted, and which provides two magnetic fields for moving said armature.

It is still another object of this invention to provide an improved rotary solenoid actuated valve which includes a novel torque spring means for returning the solenoid armature to a de-energized starting position.

It is still another object of this invention to provide an improved rotary solenoid actuated valve which includes a spring means to maintain the solenoid armature in an initial contact with a central core-bearing.

Other objects, features and advantages of this invention will be apparent from the following detailed description, appended claims, and the accompanying drawings.

In the drawings:

FIG. 3 is an elevational view in section, taken along the lines 3—3 of FIG. 2, and looking in the direction of the arrows;

FIG. 4 is an elevational view in section, taken along the lines 4—4 of FIG. 2, and looking in the direction of the arrows;

FIG. 5 is a horizontal section view, taken along the lines 5—5 of FIG. 3, and looking in the direction of the arrows;

FIG. 6 is a top plan view, taken along the lines 6—6 of FIG. 4, and looking in the direction of the arrows;

FIG. 7 is an enlarged, horizontal section view, taken along the lines 7—7 of FIG. 3, and looking in the direction of the arrows;

FIG. 8 is a fragmentary, horizontal section view, taken along the lines 8—8 of FIG. 3, and looking in the direction of the arrows;

FIG. 9 is a detail view in elevation of the solenoid armature and the associated stops taken along the lines 9—9 of FIG. 5, and looking in the direction of the arrows;

FIG. 10 is a fragmentary, enlarged, horizontal section view, taken along the lines 10—10 of FIG. 4, and looking in the direction of the arrows;

FIG. 11 is a detailed view of a portion of the solenoid armature to an enlarged scale;

FIG. 12 is an enlarged, fragmentary, elevational section view of a portion of the valve membership and a portion of the armature; and, FIG. 13 is a top plan view of the structure illustrated in FIG. 12, taken along the line 13—13 thereof, and looking in the direction of the arrows.

Figure 2:
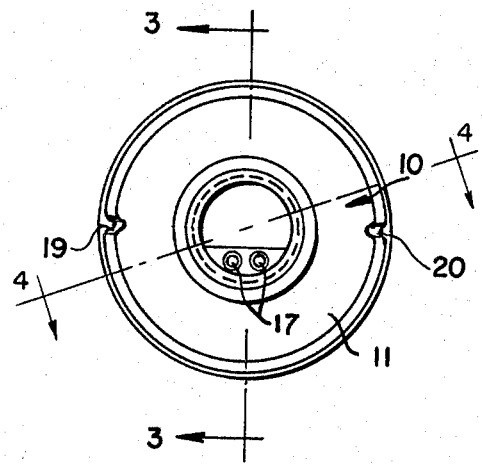
FIG. 2 is a top plan view of the embodiment of FIG. 1, taken along the lines 2—2 thereof.
Figure 1:
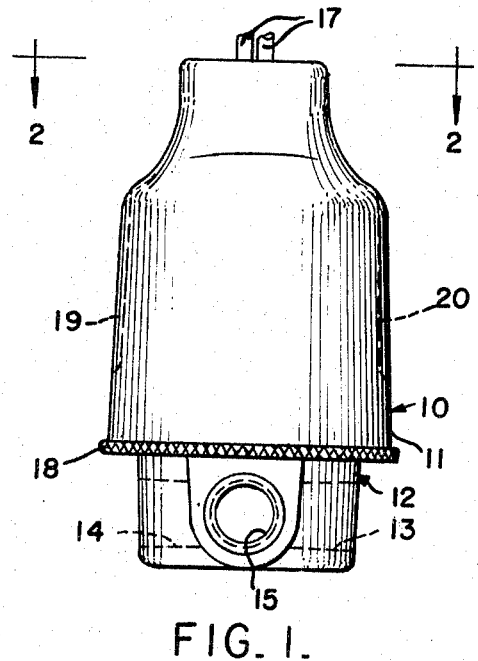
FIG. 1 is a view in elevation of one illustrative embodiment of this invention.

FIGS. 1 and 2 are views in elevation and plan, respectively, of one illustrative embodiment of a solenoid operated, pressure fluid valve according to this invention. As therein depicted, the rotary solenoid operated valve assembly 10 has a generally cylindrical cover or housing 11 beneath which is removably mounted a fluid flow body portion 12 having ports 13 and 14, shown in FIG. 3, and 15 and 16, as viewed in FIG. 4. Valve 10 is a "four-way," rotary solenoid actuated valve assembly which means that fluid flow in four directions may be controlled in response to flow of current through a pair of conductors 17. The fluid flow body portion 12 is removably coupled to the cover 11 by means of a threaded retaining ring 18 which will be subsequently described in detail. The cover 11 is substantially symmetrical about a vertical axis except that the cover 11 is provided with a pair of longitudinal, diammetrically opposed V-shaped alignment notches 19, 20, as best seen in FIG. 2. The retaining ring 18 threadably engages the inner surface of the cover 11 and slidably engages an outwardly projecting flange 21 of the fluid flow body 12 and forces the body 12 into engagement with the shoulder 23 on the cover 11.

FIGS. 3 and 4 are views in elevation and in section of the valve structure of FIG. 2, taken at right angles relative to each other, along the section lines 3—3 and 4—4, respectively. As shown in FIGS. 3 and 5, a generally E-shaped magnetic frame 22 is employed to support a solenoid coil 24 in a manner such that the coil 24 encircles a generally rectangular central portion 25 of the frame 22. The arms of the E-shaped frame 22 terminate in a pair of pole pieces 26 and 27 which are diametrically opposite each other relative to the central portion 25. A solenoid armature 30 is positioned between the pole pieces 26 and 27 and is rotatably supported by means of a suitable bushing or thrust bearing 74. The solenoid coil 24 is retained on the rectangularly shaped central portion 25 of the magnetic frame 22 by means of a detachable coil retaining snap ring 28. An armature positioning and hold-down spring 32 rests in a cylindrical slot in a valve element or valve member 34 and bears against a slot 31 in the lower surface of the armature 30.

The valve member or element 34 rests in a generally cylindrical recess 35 of the flow control body portion 12 and is centrally located in the recess 35 by means of a combination of a bearing ring 36 and a retaining cup 38 which encircles the valve element 34 and engages the bearing ring 36. The valve element 34 has a pair of vertically projecting blades 37, 39 which engage the slot 31 in the lower surface of the armature 30. The central position of the slot 31 is enlarged to receive the helical spring 32 and receives the blades 37, 39 on opposite sides of the helical spring 32. The fluid flow body 12 is provided with an annular recess 40 which encircles the cylindrical recess 35 of body 12 to receive the resilient O-ring 41, which defines a fluid seal between the bearing cup 36 and the body 12. A suitable retaining snap ring 42 is positioned in a recess 43 of body 12 to retain the bearing cup 36 in the cylindrical recess 35. The valve element 34 is provided with a circular recess 44 in which is mounted a suitable O-ring 45 to maintain a fluid sealing relationship between the valve element 34 and the cup 38. The internal fluid pressures brought to bear against the O-ring seal 45 in the circular cavity 44 of valve element 34 are transferred to the bearing ring 36 to constitute an equal or greater force than that tending to lift the valve member 34 from its mating surface in flow control body portion 12. Consequently, a stable and constant neutralization of the internal forces is maintained throughout a designated pressure range. The valve member or element 34 is provided with a substantially rectangular diametrically extending recess 47 on the lower portion thereof. The recess 47 communicates with a suitable longitudinal, axially aligned fluid passage 48 in the body 12. The longitudinal passage 48 communicates with a radial passage 50 which terminates in the port 13, which is preferably employed as the pressurized fluid inlet port. The body 12 includes a pair of fluid balancing pockets 51 and 53 which cause the fluid pressure in the recess 47 to balance the valve element 34 relative to its rotational axis during rotation. As shown in FIGS. 3 and 8, a longitudinal fluid passage 54 communicates with the threaded port 14 and with the cylindrical recess 35 in the body 12. The port 14 is preferably an exhaust port which is usually vented to the atmosphere. The recess or passage 54 terminates in an enlarged recess 55 which receives a cylindrical bushing 56, which limits the rotation of the valve member 34 about its rotational axis.

As best seen in FIG. 4, the body 12 includes a longitudinal passage 58 which communicates with the cylindrical recess 35 in the body 12 and when the valve member 34 is in the position shown in FIG. 4 and FIG. 8, the rectangular recess 47 of the valve member 34 communicates with the longitudinal passage 58 and with the passage 48. The longitudinal passage 58 communicates with a radially directed, cylindrical passage 59, which communicates with the threaded port 15. The body 12 includes still another longitudinal fluid passage 60 which communicates with the cylindrical recess 35 (FIG. 4) and with a radially directed cylindrical recess 61 which terminates in the threaded port 16.

As shown in FIGS. 3 and 5, the valve assembly 10 is provided with an armature stop plate 64 which has a pair of armature stops 65 and 66 struck therefrom to limit the open or de-energized rotation of the armature 30 relative to the valve member axis. The armature stop plate 64 is provided with a retaining snap ring 67 which retains the stop plate 64 in position. The snap ring 67 is seated in a circular recess 68 to retain the armature stop plate 64 in position in the housing 11.

As best seen in FIGS. 4 and 6, the armature 30 is provided with a torsion return spring 70 which extends axially of the valve assembly 10 and engages a suitable recess 71 in the armature 30. The torsion spring 70 engages a suitable aperture 72 in the magnetic frame 22 in such manner as to cause the armature 30 to bear against stops 65 and 66. In FIG. 5, the armature 30 is shown in full lines in its position of engagement with the stops 65 and 66, and is shown in dotted lines as 30′ in the position in which the armature flat end surfaces engages the flat surfaces of pole pieces 26 and 27. The torsion spring 70 extends through the armature bearing 74 which is positioned in a suitable cylindrical recess 75 in the rectangular central portion 25 of the frame 22 and projects into a portion of the recess 71 in the armature 30. The bearing 74 rotatably supports armature 30.

One of the features of this invention resides in the provision of the E-shaped magnetic frame 22 which is positioned relative to the armature 30 such that the armature 30 provides two flux paths operating on the armature 30 such that current flow through the solenoid coil 24 produces a strong pair of flux fields between the armature 30 and the pole pieces 26 and 27 to efficiently cause the armature 30 to align itself in a direction linking the two pole pieces 26 and 27, as shown by the numeral 30′ in dotted lines in FIG. 5 in which the angularly disposed armature end surfaces engage the pole pieces 26 and 27. When the current through the coil 24 is interrupted, the torsion spring 70, which is preloaded as explained above, rotates the armature 30 to a position of engagement with the stops 65 and 66 on the stop plate 64.

FIG. 7 is a horizontal section view, taken along the line 7—7 of FIG. 3, looking in the direction of the arrows, and showing the 90° spacing between the ports 13, 14, 15 and 16. FIG. 7 shows, in dotted lines, the valve element 34 positioned so that its rectangular recess 47 defines a fluid communication path between the longitudinal passage 48, the longitudinal passage 60 and the fluid balancing pocket 53 such that fluid flow exists between the ports 13 and 15. In this position, the valve member 34 is in close proximity to the bushing 56 and passage 58 communicates with the exhaust passage 54.

FIG. 8 is a detail showing the opposite position of the valve member 34. As shown in FIG. 8, the valve member 34 covers an aperture or longitudinal passage 58 and fluid pocket 51 with diametrically opposite portions of the valve member recess 47 such that the pressure of the fluid will be balanced with respect to the force upon the valve element 34 during valve rotation. Similarly, when the recess 47 in the valve element 34 establishes a communicating path for the flow of fluid between the longitudinal passages 48 and 60 and fluid pocket 53, the forces of the fluid flowing through the recess 47 will be balanced with respect to the axis of rotation of the valve element 34 when rotation is reversed because the passage 60 is located on the diametrically opposite side of the axis of rotation of the valve element 34 from fluid pocket 53. The balancing effect provided by the blind pockets 51 and 53 is effective while the valve element 34 is in transit or moving between the two operating positions. The balancing effect occurs because the blind pockets 51 and 53 are only partially open during movement of the valve element 34 so as to permit fluid under pressure from the recess 47 to enter these pockets and exert a balancing force on the valve element 34.

FIG. 9 is a side view in elevation of the armature 30, the stop plate 64 and the snap ring 67, showing the armature 30 in engagement with the stops 65 and 66 of the stop plate 64.

FIG. 10 is a bottom plan view of the rectangular central portion 25 of the central portion of the magnetic frame 22 and showing the engagement of the coil retaining snap ring 28 with the central portion 25. This view also shows the torsion spring 70 located centrally in the rectangular central portion 25 and the bushing 74 encircling the torsion spring 70. FIGS. 4 and 10 show how the coil retaining snap ring 28 includes a portion 29 which engages a suitable notch in the rectangular central portion 25 of the magnetic frame 22 when rotated 90°.

FIG. 11 is a view to an enlarged scale of a portion of the armature 30 and the torsion spring 70. The torsion spring 70 is shown as having a pre-load of the order of 10 to 15 degrees. In other words, the torsion spring 70 is inserted in slot 71 of armature 30 and the armature is rotated by rotating plate 64 and fixing plate 64 in this rotated position. By this method, spring 70 is rotated in the order of 10 to 15 degrees relative to the top portion 73 (FIG. 4) of the spring 70, such that the spring 70 tends to maintain the armature 30 in a position of engagement with the stops 65 and 66 as shown in FIG. 5.

FIG. 12 is a view partly in section to an enlarged scale of a portion of the valve element 34 and the armature 30, showing the coupling between the valve element 34 and the armature 30. The slot 31 in the armature 30 has a cylindrical portion 76 to receive the upper end of a helical armature biasing spring 32 and a pair of substantially rectangular slots 71, only one of which is shown, for receiving the blades 37 and 39. Preferably, the slots 71 are wider than the blades 37 and 39 to permit the armature 30 to have five degrees free travel in each direction before the armature 30 engages the blades 37 and 39 to give the advantage of impact to starting valve rotation.

FIG. 13 is a plan view taken along the lines 13—13 of FIG. 12 and showing the top of the valve element 34 and showing in dotted lines the slot 31 of the armature 30. The blades 37 and 39 are shown as being angularly displaced relative to the slot 31 such that the blades 37 and 39 engage the edge of the slot 31. The helical spring 32 which acts to hold the valve element 34 on its seat is shown resting in a cylindrical slot 33.

From the foregoing explanation, it is understood how the valve can be quickly and easily disassembled by unscrewing the retaining ring 18 which permits the fluid flow body 12 to be released from the cover 11, and the sliding blade and slot engagement between the valve element 34 and the armature 30 permits the removal of the valve element relative to the armature. Thus it is possible to replace the fluid flow controlling portion or to replace the rotary solenoid and armature portion of the valve. Further, the novel arrangement of parts shows how a single bearing in the form of a combination bushing and retaining ring 38 and 36, respectively, acts to align and retain the valve element 34. Still further, because of the symmetrical, diametrical relationship between the outlets and pockets, and the axial relationship of the inlet passage of the valve element 34, the pressures tending to separate the valve element 34 are balanced at all times to maintain stability during operation. This feature combined with the counterbalancing effect of the opposing force developed by internal pressures exerted against the bushing 38 permit the use of a valve element of a given size over a relatively wide operating range of fluid pressures.

While I have shown and described one illustrative embodiment of this invention, it is understood that the concepts thereof may be employed in other embodiments without departing from the spirt and scope of this invention.

What is claimed is:

1. A solenoid operated pressure fluid control valve comprising:
   a cover;
   an E-shaped magnetic frame removably mounted in said cover and having a pair of pole pieces on opposite ends thereof;
   coil means mounted on the central arm of said frame;
   an armature;
   bearing means for rotatably mounting said armature on said central arm in a position to engage said pole pieces;
   stop means for limiting the rotation of said armature;
   spring means coupled to said armature for normally maintaining said armature in angegement with said stop means;
   a fluid flow housing secured to said cover; and
   a valve member rotatably mounted in said housing and coupled to said armature.

2. The combination according to claim 1 wherein each of said pole pieces has a substantially flat surface positioned to engage a flat surface of said armature.

3. The combination according to claim 2 wherein said bearing means encircles said spring means.

4. The combination according to claim 1 wherein said spring means is a torsion spring coupled to said magnetic frame and to said armature.

5. The combination according to claim 4 wherein said armature has a slot therein and wherein said spring means is a pre-loaded torsion spring slidably coupled to said slot.

6. The combination according to claim 1 wherein said valve member slidably and rotatably engages said fluid flow housing and wherein said fluid flow housing includes a plurality of fluid passages terminating in diametrically opposed openings relative to said valve member.

7. The combination according to claim 6 wherein said fluid flow housing has a fluid aperture axially positioned relative to said valve member.

8. The combination according to claim 1 including spring means engaging said armature and said valve member for holding said valve member in engagement with said fluid flow housing.

9. The combination according to claim 8 including bearing means rotatably supporting said valve member within said housing.

10. The combination according to claim 1 wherein said fluid flow housing is removably mounted in said cover.

11. In a fluid flow controlling solenoid operated valve, the combination comprising:
    a cover;
    a magnetic frame including a central portion and at least one pole piece;
    coil means magnetically coupled to said magnetic frame;
    armature means rotatably mounted on said central portion and positioned to engage said pole piece;
    torsion spring means coupling said armature to said magnetic frame;
    a fluid flow housing removably coupled to said cover; and
    a valve member rotatably mounted in said housing and coupled to said armature.

12. The combination according to claim 11 wherein said valve member includes a blade which is slidably coupled to a slot in said armature, said slot being wider than said blade to permit a limited free travel of the armature relative to the valve member.

13. The combination according to claim 11 wherein said valve member includes an elongated diametrically extending slot on the surface thereof engaging said fluid flow housing.

14. The combination according to claim 13 wherein said fluid flow housing includes a longitudinal fluid passage axially positioned relative to said valve member.

15. The combination according to claim 14 wherein said fluid flow housing includes a pair of fluid openings circumferentially spaced relative to said valve member.

16. The combination according to claim 14 wherein said fluid flow housing includes at least one pocket diametrically opposite from one of fluid openings to provide a counterbalancing force upon said valve member.

17. In a pressurized fluid control device, the combination comprising:
    a magnetic E-shaped frame, the opposite ends of which terminate in a pair of pole pieces;
    an armature rotatably mounted on the central arm of said magnetic frame, said armature having a pair of angularly disposed end surfaces oriented to engage said pieces upon rotation of said armature relative to said central portion of said frame; and
    spring means for normally positioning said armature relative to said frame.

18. In a device according to claim 17, a coil encircling said central arm and a coil retaining washer on said central arm engaging said coil.

19. In a pressurized fluid flow control solenoid operated valve, the combination comprising:
   a cover;
   a magnetic frame mounted within said cover;
   coil means mounted on said frame;
   a fluid flow housing;
   means for removably mounting said fluid flow housing in said cover;
   said magnetic frame including a pair of pole pieces;
   an armature; and,
   means for rotatably mounting said armature on said frame.

References Cited

UNITED STATES PATENTS 3,117,594   1/1964   Gordon   137—625

M. CARY NELSON, *Primary Examiner.*

W. J. JOHNSON, *Assistant Examiner.*